(12) United States Patent
Pearson (10) Patent No.: US 6,841,275 B2
(45) Date of Patent: Jan. 11, 2005

(54) METHOD AND APPARATUS FOR CONTROLLING VOLTAGE FROM A FUEL CELL SYSTEM

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 200 days.

(21) Appl. No.: 10/017,470

(22) Filed: Dec. 14, 2001

(65) Prior Publication Data

US 2003/0113594 A1 Jun. 19, 2003

(51) Int. Cl.$^7$ .......................... H01M 8/04; H01M 8/24; H01M 16/00
(52) U.S. Cl. ............................. 429/9; 429/12; 429/23; 320/101
(58) Field of Search .............................. 429/9, 13, 12, 429/22, 23, 25; 320/101

(56) References Cited

U.S. PATENT DOCUMENTS

| | | | |
|---|---|---|---|
| 3,800,208 A | * 3/1974 | Macharg | 320/139 |
| 4,000,003 A | 12/1976 | Baker et al. | 429/7 |
| 4,056,764 A | 11/1977 | Endo et al. | 320/3 |
| 4,721,660 A | * 1/1988 | Kujas | 429/40 |
| 4,839,574 A | 6/1989 | Takabayashi | 320/3 |
| 4,883,724 A | * 11/1989 | Yamamoto | 429/23 |
| 4,904,548 A | 2/1990 | Tajima | 429/22 |
| 4,931,947 A | 6/1990 | Werth et al. | 364/492 |
| 4,962,462 A | 10/1990 | Fekete | 364/492 |
| 5,154,986 A | 10/1992 | Takechi et al. | 429/23 |
| 5,318,142 A | * 6/1994 | Bates et al. | 180/65.2 |
| 5,334,463 A | 8/1994 | Tajima et al. | 429/9 |
| 5,339,018 A | * 8/1994 | Brokaw | 320/147 |
| 5,482,790 A | 1/1996 | Yamada et al. | 429/9 |
| 5,624,768 A | 4/1997 | Tanokura | 429/23 |
| 5,780,980 A | 7/1998 | Naito | 318/139 |
| 5,929,594 A | 7/1999 | Nonobe et al. | 320/104 |
| 5,998,885 A | 12/1999 | Tamor et al. | 307/10.1 |
| 6,100,665 A | * 8/2000 | Alderman | 320/127 |
| 6,134,124 A | 10/2000 | Jungreis et al. | 363/34 |
| 6,158,537 A | 12/2000 | Nonobe | 180/65.3 |
| 6,184,593 B1 | 2/2001 | Jungreis | 307/64 |
| 6,214,484 B1 | 4/2001 | Hauer | 429/9 |

(List continued on next page.)

FOREIGN PATENT DOCUMENTS

| | | |
|---|---|---|
| DE | 100 10 985 A1 | 9/2001 |
| EP | 0 136 187 A2 | 4/1985 |
| EP | 0 334 474 B1 | 9/1989 |
| EP | 1 009 054 A2 | 6/2000 |
| EP | 1 065 775 A2 | 1/2001 |
| GB | 1 131 171 | 10/1968 |
| GB | 2 281 642 A | 3/1995 |
| WO | WO 01/71885 A1 | 9/2001 |
| WO | WO 01/73879 A1 | 10/2001 |
| WO | WO 02/084670 A1 | 10/2002 |

OTHER PUBLICATIONS

Boyer et al. "Evaluation of Methods to Increase the Oxygen Partial Pressure in PEM Fuel Cells", Journal of Applied Electrochemistry, vol. 29, pp. 1095–1102, 1999.*

Fuglevand, W., "Full Cell Power System and Method of Controlling a Fuel Cell Power System," U.S. Publication No. 2001/0053465 A1, published Dec. 20, 2001, Application No. 09/916,791, filed Jul. 26, 2001.

(List continued on next page.)

*Primary Examiner*—Gregg Cantelmo
(74) *Attorney, Agent, or Firm*—Seed IP Law Group PLLC (57) ABSTRACT

A fuel cell system electrically couples a battery in parallel with the fuel cell stack to power a load. An operational condition of the battery is compared to a desired operating condition and a partial pressure of a reactant flow to at least a portion of the fuel cell stack is adjusted based on the determined amount of deviation. The operational condition can include voltage, charge of the battery. Individual fuel cell systems can be combined in series and/or parallel to produce a combined fuel cell system having a desired output voltage and current.

6 Claims, 11 Drawing Sheets

U.S. PATENT DOCUMENTS

| | | | | |
|---|---|---|---|---|
| 6,215,272 B1 | | 4/2001 | Ohara et al. | 320/104 |
| 6,497,974 B2 | * | 12/2002 | Fuglevand | 429/22 |
| 6,555,989 B1 | | 4/2003 | Pearson | 320/101 |
| 6,573,682 B1 | * | 6/2003 | Pearson | 320/101 |
| 2002/0051898 A1 | | 5/2002 | Moulthrop, Jr. et al. | 429/17 |
| 2003/0072977 A1 | | 4/2003 | Speranza et al. | 429/9 |

OTHER PUBLICATIONS

Abstract of JP 05–047396, with Japanese figures, espacenet database, Feb. 26, 1993.

Abstract of JP 06–029029, espacenet database, Feb. 4, 1994.

Abstract of JP 06–314569, espacenet database, Nov. 8, 1994.

English Language Translation of Japanese Unexamined Patent No. JP 7–105965, Apr. 21, 1995.

Abstract of JP 08–050902, with Japanese Patent cover page, espacenet database, Feb. 20, 1996.

Abstract of JP 08–213032, with Japanese Patent cover page, espacenet database, Aug. 20, 1996.

Abstract of JP 11–191424, with Japanese figures, espacenet database, Jul. 13, 1999.

Abstract of DE 19810468, espacenet database, Sep. 16, 1999.

Abstract of JP 58–133789, with Japanese figures, espacenet database, Aug. 9, 1983.

Abstract of JP 59–134573, espacenet database, Aug. 2, 1984.

Abstract of JP 01–234024, with Japanese figures, espacenet database, Sep. 19, 1989.

Pearson, M., "Fuel Cell System Multiple Stage Voltage Control Method and Apparatus," Application No. 10/017,461, filed Dec. 14, 2001.

Pearson, M., "Method and Apparatus for Multiple Mode Control of Voltage from a Fuel Cell System," Application No. 10/017,462, filed Dec. 14, 2001.

Warner, S., "Extending the Reliability of DC Power in a Telecommunications Network," in *Proceedings of the 15$^{th}$ Int'l. Telecommunications Energy Conference*, Paris, France, 1993, pp.83–86.

Maloney, T., "PEM–Battery: Design, Construction, and Test," *Power Computing Solutions, Inc.*, NETL Publications 1999 Conference Proceedings.

Ertl, H., "A Novel Multi–Cell DC–AC Converter for Applications in Renewable Energy Systems," in *Proceedings of the 43$^{rd}$Int'l Power Electronics Conference*, Jun. 2001.

Passive Component Industry, "Large–Can EDLC Capacitors: A Market in the Making," Jul./Aug. 2001, pp. 7–14.

Nickerson, J., "Ultracapacitors: Managing Power and Energy,"Darnell Group, Inc. 2000.

Kato, N., et al., "A 1kW Portable Fuel Cell System Based on Polymer Electrolyte Fuel Cells," *NTT R and D* 48(12):877–881, 1991.

Apollo 13 Review Board (Cortright Commission), "Report of Apollo 13 Review Board," NASA, pp. i–x; Appendix A, Jun. 15, 1970.

Key, T., "Fast Response, Load Matching Hybrid Fuel Cell," EPRI PEAC, Quaterly Review Meeting, Jul. 27, 2001.

* cited by examiner

METHOD AND APPARATUS FOR CONTROLLING VOLTAGE FROM A FUEL CELL SYSTEM

BACKGROUND OF THE INVENTION

1. Field of the Invention

This invention is generally related to fuel cell systems, and more particularly to controlling an output voltage of the fuel cell system.

2. Description of the Related Art

Electrochemical fuel cells convert fuel and oxidant to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane electrode interface to induce the desired electrochemical reaction. In operation, the electrodes are electrically coupled for conducting electrons between the electrodes through an external circuit. Typically, a number of MEAs are electrically coupled in series to form a fuel cell stack having a desired power output.

In typical fuel cells, the MEA is disposed between two electrically conductive fluid flow field plates or separator plates. Fluid flow field plates have flow passages to direct fuel and oxidant to the respective electrodes, namely the anode and the cathode, respectively. The fluid flow field plates act as current collectors, provide support for the electrodes, provide access channels for the fuel and oxidant, and provide channels for the removal of reaction products, such as water formed during operation of the fuel cell. The fuel cell system may use the reaction products in maintaining the reaction. For example, reaction water may be used for hydrating the ion exchange membrane and/or maintaining the temperature of the fuel cell stack.

Stack current is a direct function of the reactant flow, the stack current increasing with increasing reactant flow. The stack voltage varies inversely with respect to the stack current in a non-linear mathematical relationship. The relationship between stack voltage and stack current at a given flow of reactant is typically represented as a polarization curve for the fuel cell stack. A set or family of polarization curves can represent the stack voltage-current relationship at a variety of reactant flow rates.

In most applications, it is desirable to maintain an approximately constant voltage output from the fuel cell stack. One approach is to employ a battery in the fuel cell system to provide additional current when the demand of the load exceeds the output of the fuel cell stack. This approach often requires separate battery charging supply to maintain the charge on the battery, introducing undesirable cost and complexity into the system. Attempts to place the battery in parallel with the fuel cell stack to eliminate the need for a separate battery charging supply raises additional problems. These problems may include, for example, preventing damage to the battery from overcharging, the need for voltage, current, or power conversion or matching components between the fuel cell stack, battery and/or load, as well as the use of blocking diodes resulting in system inefficiency. A less costly, less complex and/or more efficient approach is desirable.

BRIEF SUMMARY OF THE INVENTION

In one aspect, a method of operating a fuel cell system to power a load includes: supplying current to the load from at least one of a fuel cell stack and a battery electrically coupled in parallel with the fuel cell stack; determining an operational condition of the battery; determining an amount of deviation of the determined operational condition of the battery from a desired operational condition of the battery; and adjusting a partial pressure of a reactant flow to at least a portion of the fuel cell stack based on the determined amount of deviation.

In another aspect, a method of operating a fuel cell system includes: supplying current at a number of output terminals from at least one of a fuel cell stack and a battery electrically coupled in parallel with the fuel cell stack; and adjusting a partial pressure of the reactant flow to at least a portion of the fuel cell stack to maintain a desired nominal charge on the battery.

In another aspect, a method of operating a fuel cell system includes: supplying current at a number of output terminals from at least one of a fuel cell stack and a battery electrically coupled in parallel with the fuel cell stack; determining a current flow to and from the battery; determining an amount of deviation of a nominal charge of the battery from a defined desired nominal charge of the battery based on the determined current flow; and adjusting a partial pressure of a reactant flow to at least a portion of the fuel cell stack in a mathematically defined relation to the determined amount of deviation.

In yet another aspect, method of operating a fuel cell system includes: supplying current to a number of output terminals from at least one of a fuel cell stack and a battery electrically coupled in parallel with the fuel cell stack; determining a voltage across the battery; determining an amount of deviation of the determined voltage across the battery from a defined desired nominal voltage across the battery; and adjusting a partial pressure of a reactant flow to at least a portion of the fuel cell stack in proportion to the determined amount of deviation.

In a further aspect, a fuel cell system for providing power to a load includes: a fuel cell stack having a number of fuel cells; a battery having a number of battery cells electrically couplable in parallel across the fuel cell stack; a reactant delivery system for delivering reactant to the fuel cells, including at least a first control element adjustable to control a partial pressure in a flow of a reactant to at least some of the fuel cells; and a control circuit coupled to receive signals corresponding to an operating condition of the battery and configured to determine a deviation of the operating condition of the battery from a desired operational condition of the battery based on the received signals, the control circuit further coupled to control the at least first control element based on the determined deviation.

In yet a further aspect, a fuel cell system for providing power includes: a fuel cell stack having a number of fuel cells; a battery having a number of battery cells, portions of the battery electrically couplable in parallel across respective portions of the fuel cell stack; a reactant delivery system for delivering reactant to the fuel cells including at least a first flow regulator adjustable to control a partial pressure in a flow of a reactant to at least some of the fuel cells to maintain a defined desired nominal charge of the battery.

In even a further aspect, a fuel cell system includes: a fuel cell stack having a number of fuel cells; a battery electrically couplable in parallel across the fuel cell stack; a reactant delivery system for delivering reactant to the fuel cells including at least a first flow regulator adjustable to control a partial pressure in a flow of a reactant to at least some of the fuel cells; and a control circuit coupled to receive signals corresponding to a flow of current to and from the battery and to provide a control signal to at least the first control element mathematically related to a difference between a defined desired charge on the battery and a nominal charge on the battery determined from the flow of current to and from the battery.

In yet another aspect, a fuel cell system for providing power includes: a fuel cell stack having a number of fuel cells; a battery electrically couplable in parallel across the fuel cell stack; a reactant delivery system for delivering reactant to the fuel cells, including at least a first flow regulator adjustable to control partial pressure in a flow of a reactant to at least some of the fuel cells; and a control circuit coupled to receive signals corresponding to a voltage across the battery and to provide a control signal to at least the first control element mathematically related to a difference between the voltage across the battery and a defined desired voltage across the battery.

In even another aspect, a method of operating a fuel cell system to power a load includes: electrically coupling portions of a battery having a plurality of battery cells in parallel with portions of a fuel cell stack having a plurality of fuel cells; and supplying current to the load from at least one of the fuel cell stack and the battery.

In still a further aspect, a fuel cell system for providing power to a load includes: a fuel cell stack having a number of fuel cells; a battery having a number of battery cells, groups of the battery cells electrically couplable in parallel across respective groups of the fuel cells; and a reactant delivery system for delivering reactant to the fuel cells, the reactant delivery system including at least a first control element adjustable to control the partial pressure in a flow of a reactant to at least some of the fuel cells.

In an additional aspect, fuel cell system includes: a fuel cell stack having a number of fuel cells; a battery having a number of battery cells, portions of the battery interconnected with portions of fuel cell stacks such that the battery is electrically coupled in parallel across the fuel cell stack; a reactant delivery system for delivering reactant to the fuel cells, the reactant delivery system including at least a first control element adjustable to control a partial pressure and a flow of a reactant to at least some of the fuel cells; and a control circuit coupled to receive signals corresponding to an operating condition of the battery and configured to determine the deviation of the operating condition of the battery from a desired operational condition of the battery based on the received signals, the control circuit further coupled to control the at least first control element based on the determined deviation.

In yet another aspect, a fuel cell system to power a load includes: means for supplying current to the load from at least one of a fuel cell stack and a battery electrically coupled in parallel with the fuel cell stack; means for determining an operational condition of the battery; means for determining an amount of deviation of the determined operational condition of the battery from a desired operational condition of the battery; and means for adjusting a partial pressure of the reactant flow based on the determined amount of deviation for at least one reactant flow to at least a portion of the fuel cell stack.

In yet still a further aspect, a combined fuel cell system includes two or more individual fuel cell systems electrically coupled in series and/or parallel combinations to produce a desired current at a desired voltage.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understanding that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope of meaning of the claimed invention.

General Embodiment of Fuel Cell System

Figure 1:
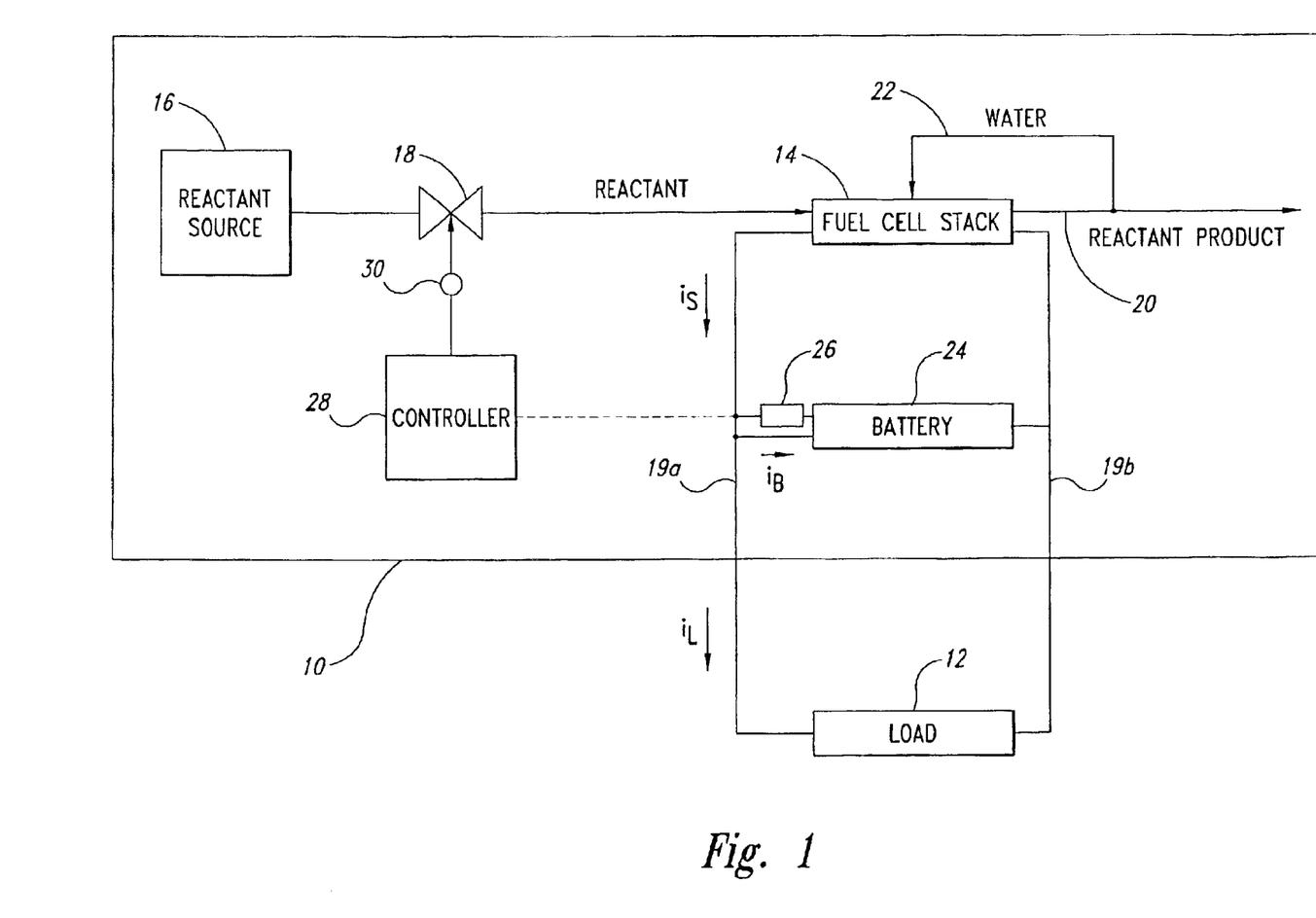
FIG. 1 is a schematic diagram of a fuel cell system having a fuel cell stack and battery in parallel powering a load in accordance with an illustrated general embodiment of the invention.

FIG. 1 shows a fuel cell system 10 powering a load 12 according to a general embodiment of the invention. The fuel cell system 10 includes a fuel cell stack 14 composed of a number of individual fuel cells electrically coupled in series. The fuel cell stack 14 receives reactants, such as hydrogen and air, from a reactant source 16 via a control element such as one or more compressors, pumps and/or valves 18, or other regulating means. The fuel cell stack 14 produces reactant product represented by arrow 20, typically including water. As represented by arrow 22, some or all of the water may be returned to the fuel cell stack 14 to hydrate the membrane.

The fuel cell stack 14 can be modeled as an ideal battery having a voltage equivalent to the open circuit voltage and a series resistance $R_S$. The value of the series resistance $R_S$ is principally a function of stack current, the availability of reactants and time. The series resistance $R_S$ varies in accordance with the polarization curves for the fuel cell stack 14. The series resistance $R_S$ can be adjusted by controlling the availability of reactants to drop a desired voltage for any given current, thus allowing an approximately uniform stack voltage $V_S$ across a range of currents $I_S$. However, simply decreasing the overall reactant and reaction pressures within the fuel cell system 10 may interfere with the overall system operation, for example interfering with the hydration of the ion exchange membrane and/or temperature control of the fuel cell stack. To avoid these undesirable results, the fuel cell system 10 may adjust the reactants partial pressure.

The fuel cell stack 14 produces the stack voltage $V_S$ across a high voltage bus formed by the positive and negative voltage rails 19a, 19b. The stack current $I_S$ flows to the load 12 from the fuel cell stack 14 via the voltage rails 19a, 19b. As used herein, high voltage refers to the voltage produced by conventional fuel cell stacks 14 to power work loads, and is used to distinguish between other voltages employed by fuel cell control system (e.g., 5V). Thus, high voltage and is not necessarily "high" with respect to other electrical systems.

A battery 24 is electrically coupled in parallel with the fuel cell stack 14 on the rails of high voltage bus 19a, 19b to power the load 12. The open circuit voltage of the battery 24 is selected to be similar to the full load voltage of the fuel cell stack 14. The internal resistance $R_B$ of the battery 24 is selected to be much lower than the internal resistance $R_S$ of the fuel cell stack 14. Thus, the battery 24 acts as a buffer, absorbing excess current when the fuel cell stack 14 produces more current than the load 12 requires, and providing current to the load 12 when the fuel cell stack 14 produces less current than the load 12 requires. The bus voltage will be the open circuit voltage of the battery minus the battery discharging current multiplied by the value of the battery's internal resistance. The smaller the internal resistance $R_B$ of the battery 24, the smaller the variations in bus voltage.

The fuel cell system 10 includes a sensor 26 for sensing an operating condition of the battery, such as battery voltage, current and/or temperature. Such sensors are generally well-known in the art. The sensor 26 provides the operating condition information to a controller 28 that adjusts the flow of reactant to the fuel cell stack 14 accordingly. The controller 28 is coupled to the valve 18 via an actuator 30.

The battery 24 covers any short term mismatch between the available reactants and the consumed reactants, thus the speed at which the fuel cell reactant supply needs to react can be much slower than the electrical load changes. The speed at which the fuel cell reactant supply needs to react mainly effects the depth of the charge/discharge cycles of the battery 24.

Figure 2:
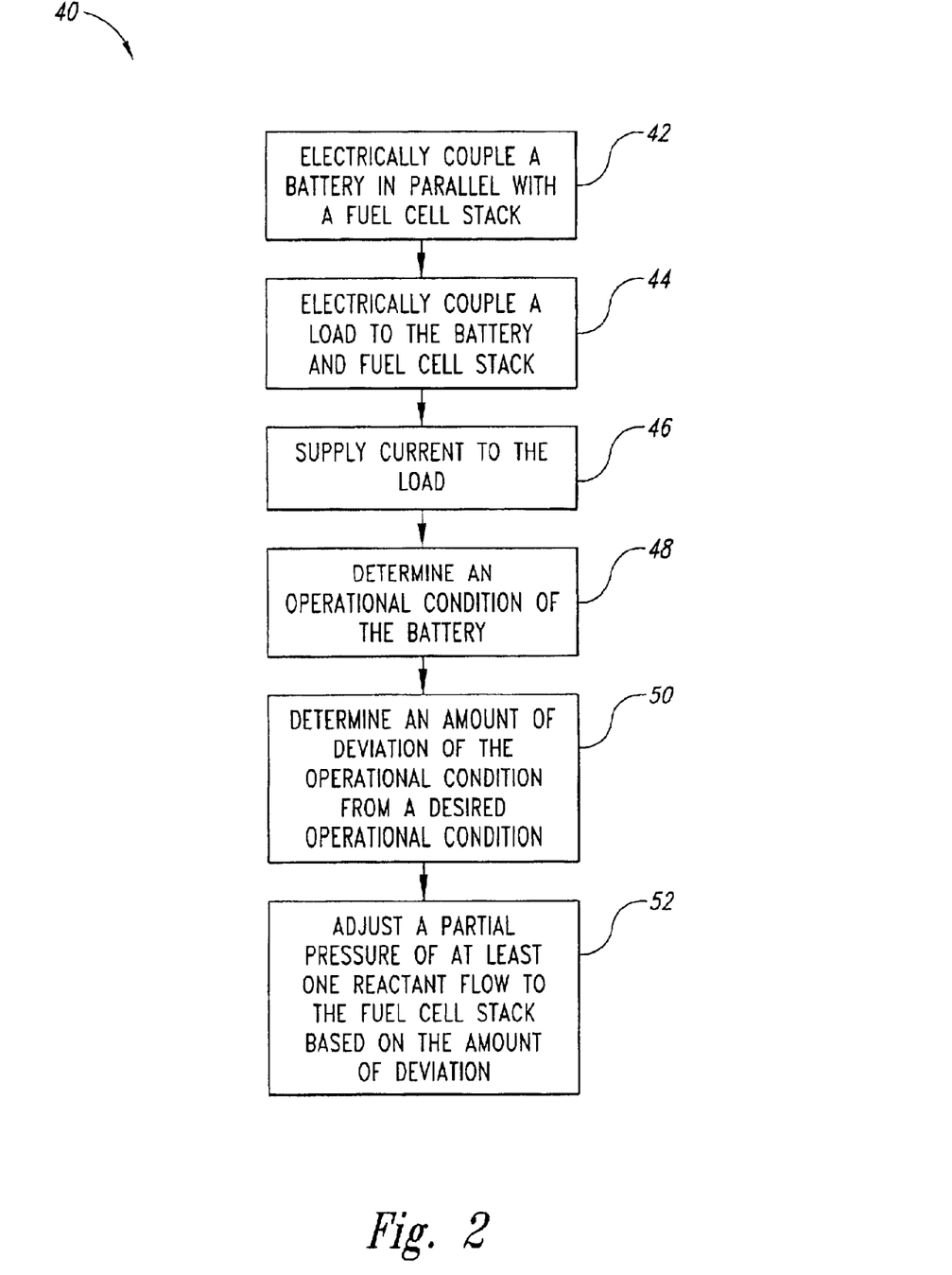
FIG. 2 is a flow diagram of an exemplary method of operating fuel cell system of FIG. 1.

FIG. 2 illustrates an exemplary method 40 of operating the fuel cell system 10 of FIG. 1. In step 42, the battery 24 is electrically coupled in parallel with the fuel cell stack 14. In step 44, the load 12 is electrically coupled to the battery 24 and fuel cell stack 14. In step 46, at least one of the fuel cell stack 14 and battery 24 supplies current to the load 12. The fuel cell stack 12 supplies the current to the load 12 where the fuel cell stack is producing sufficient current to meet the demand of the load. Excess current from the fuel cell stack 14 recharges the battery 24. The battery 24 may supply a portion or even all of the power to the load 12 where the fuel cell stack 14 is not producing sufficient power to meet the demand.

In step 48, the fuel cell system 10 determines an operational condition of the battery 24. In step 50, the controller 28 determines an amount of deviation of the operational condition from a desired operational condition. In step 52, the fuel cell system 10 adjusts a partial pressure of at least one reactant flow to the fuel cell stack 14 based on the determined amount of deviation. By varying the partial pressure of fuel and/or oxidant, the value of the internal series resistance $R_S$ inherent in the fuel cell stack 14 can be varied to control the voltage that is dropped at any given stack output current. By varying the partial pressure in such a way as to produce the same voltage drop at any stack output current, the stack output voltage can be held approximately constant at some nominal value.

Figure 3:
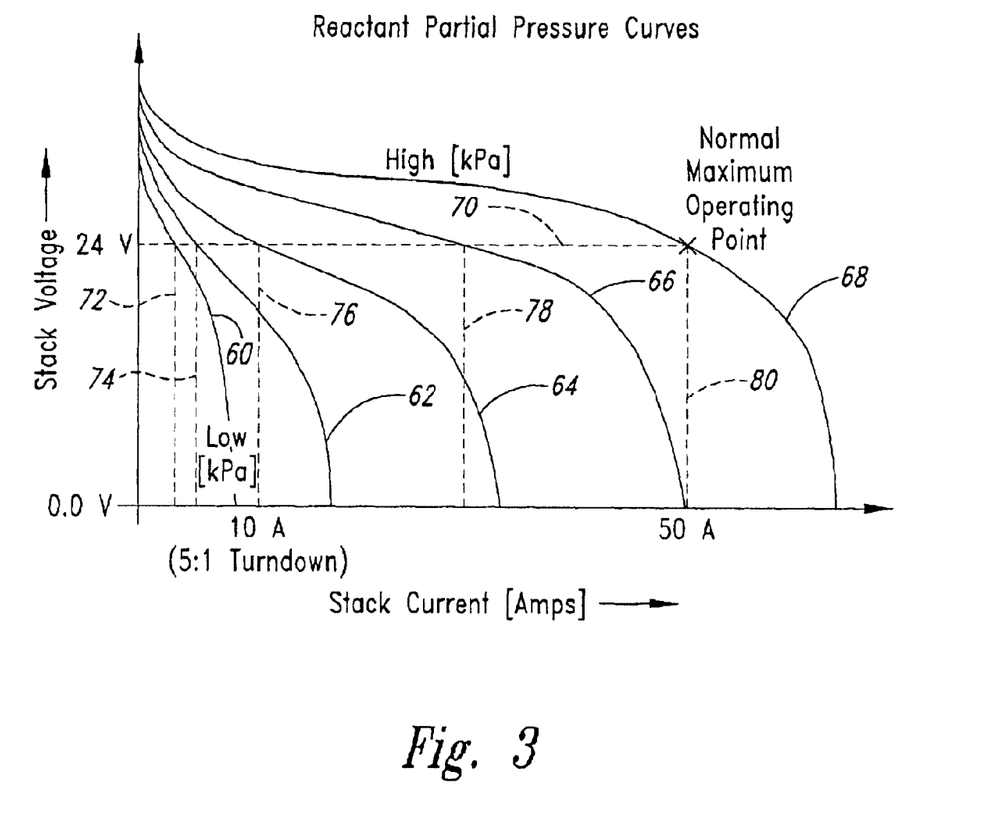
FIG. 3 is a graphical representation of the polarization curves for an exemplary fuel cell stack, for five exemplary partial pressures.

FIG. 3 illustrates exemplary polarization curves for the fuel cell stack 14, corresponding to five different reactant partial pressures. Stack voltage $V_S$ is represented along the vertical axis, and stack current is represented along the horizontal axis. A first curve 60 represents the polarization at a low reactant partial pressure. Curves 62, 64, 66 and 68 represent the polarization at successively increasing reactant partial pressures. A broken line 70 illustrates a constant nominal output voltage of 24 volts. Vertical broken lines 72, 74, 76, 78, 80 illustrate the stack current corresponding to the 24 volt output for the respective partial pressure curves 60, 62, 64, 66, 68.

Current Controlled Embodiment of Fuel Cell System

Figure 4:
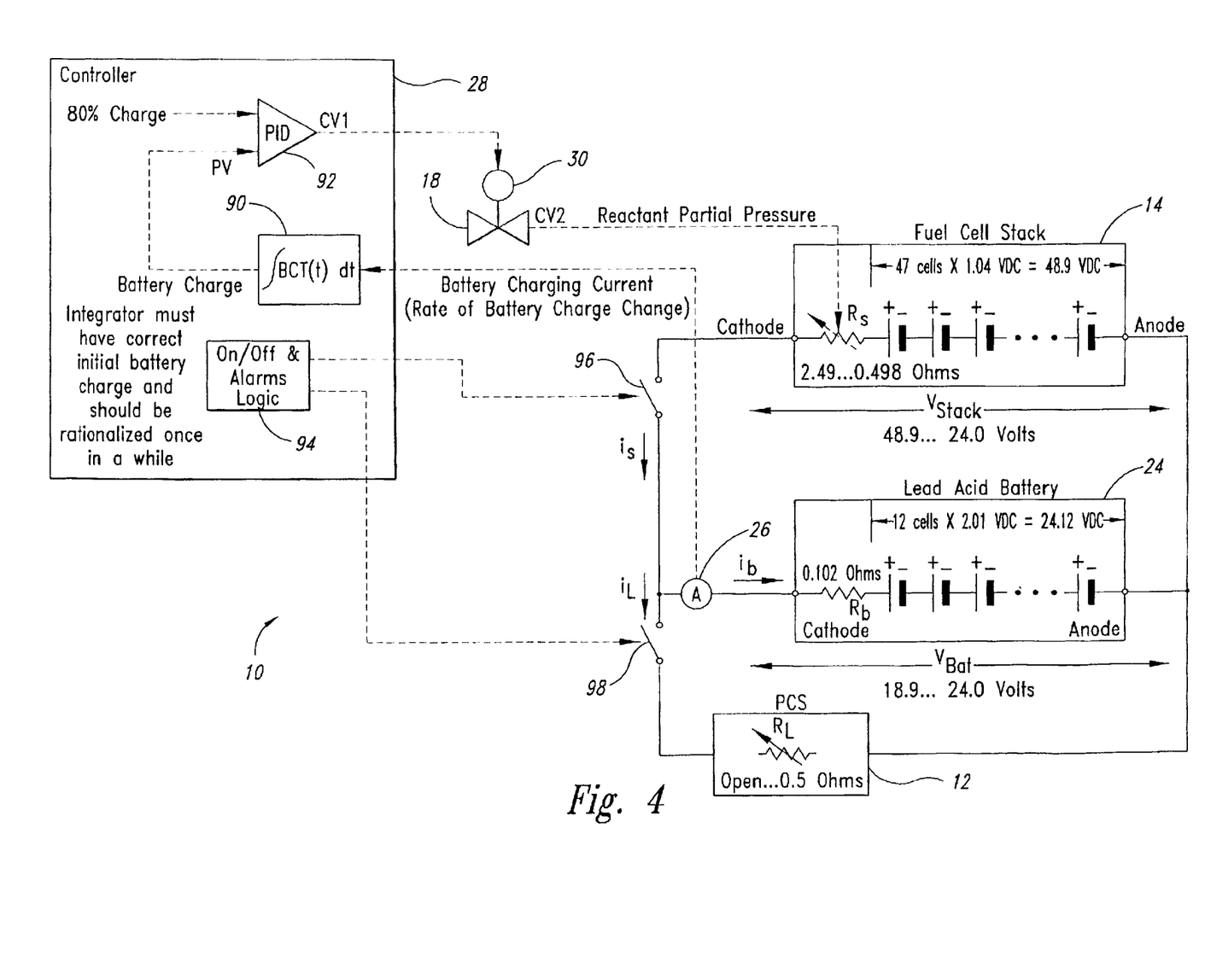
FIG. 4 is a schematic diagram of a first specific embodiment of the fuel cell system of FIG. 1, that employs the current flow to and from the battery to maintain an approximately constant voltage output.

FIG. 4 shows a first specific embodiment of a fuel cell system 10, employing battery current as the operating condition. This specific embodiment and those other specific embodiments described herein are substantially similar to previously described embodiments, and common acts and structures are identified by the same reference numbers. Only significant differences in operation and structure are described below.

In the embodiment of FIG. 4, the sensor 26 takes the form of a current sensor coupled to sense the flow of current to and from the battery 24. The controller 28 includes a battery charging current integrator 90. The integrator 90 may be a discrete component or may be implemented in a microprocessor or microcontroller. The integrator 90 integrates the battery charging current to determine the approximate overall charge of the battery 24. The integrator 90 should be supplied with the correct initial battery charge at the start of operation, and should be rationalized from time to time. The resulting process variable ("PV") is supplied to a comparator 92.

The comparator 92 may be a discrete component or may be implemented in a microprocessor or microcontroller. The comparator 92 compares the PV to a set point and produces a first control voltage ("CV1"). The set point reflects the desired nominal battery charge at the start of operation, and may typically be between approximately 75% and approximately 95% of the full charge of the battery. The comparator 92 supplies the resulting CV1 to the actuator 30 which adjusts the compressor or valve 18 accordingly. The valve 18 adjusts the reactant partial pressure to the fuel cell stack 14, which serves as a second control variable ("CV2") for the fuel cell system 10. As noted above, controlling the reactant partial pressure adjusts the internal resistance of $R_S$ of the fuel cell stack 14 as well as adjusting the power output of the fuel cell stack 14.

The controller 28 may also include logic 94 for controlling various switches, such as a first switch 96 that electrically couples the battery 24 in parallel with the fuel cell 14, and second switch 98 that electrically couples the load 12 in parallel with the fuel cell stack 14 and the battery 24.

Figure 5:
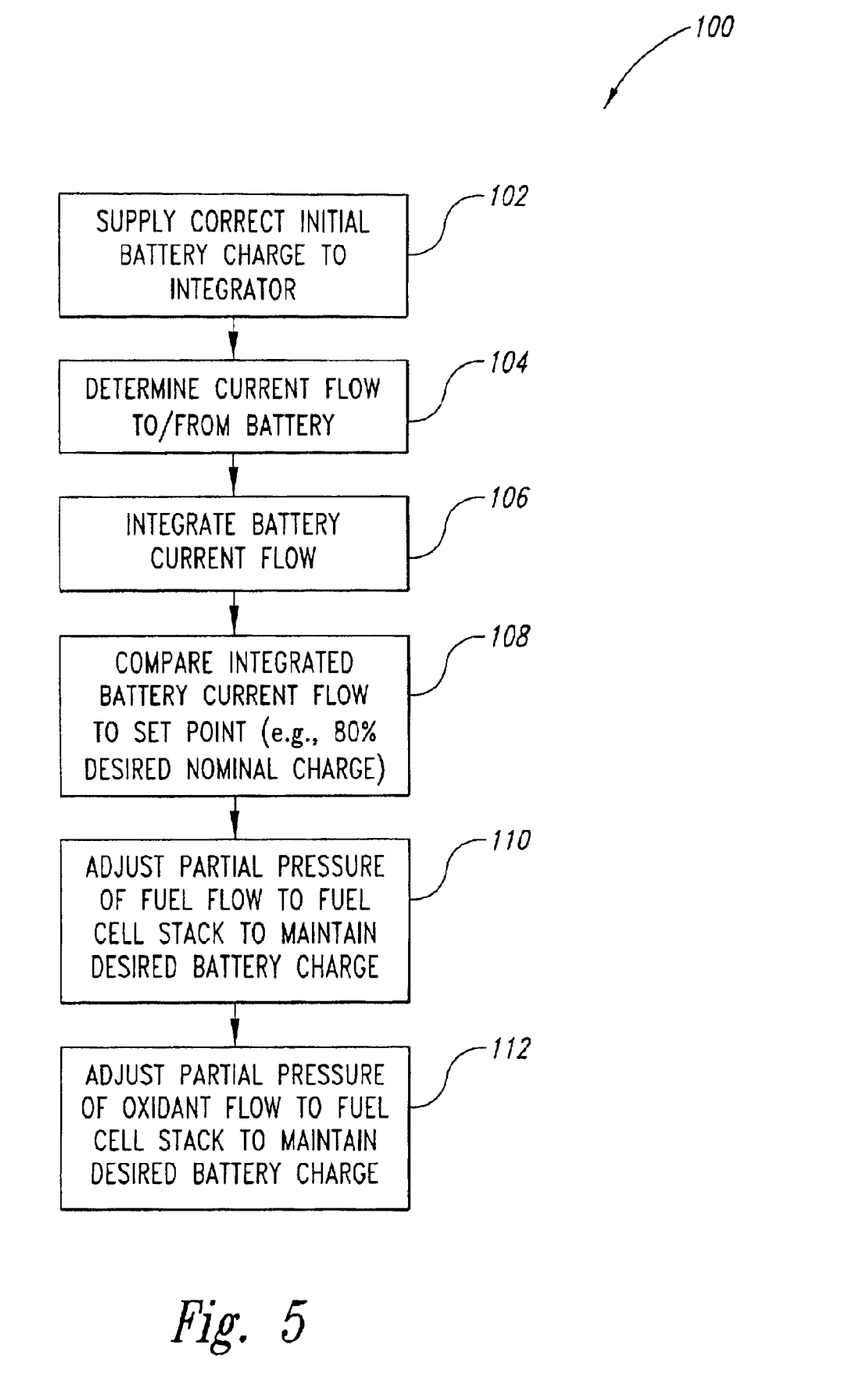
FIG. 5 is a flow diagram of one method of operating the fuel cell system of FIG. 4.

FIG. 5 shows a method 100 of operating the fuel cell system 10 of FIG. 4. In step 102, the correct initial battery charge is supplied to the integrator 90. In step 104, the sensor 26 determines the current flow to and from the battery 24. In step 106, the integrator 90 integrates the battery current flow to determine the total charge of the battery 24.

In step 108, the comparator 92 compares the integrated battery current flow to a set point. The set point is selected to apply a trickle charge to the battery in order to maintain the battery 24 at a suitable float voltage, thereby preventing damage to the battery 24, for example from sulfating. A suitable range for may be between approximately 75% to 95% of the desire nominal battery charge, with approximately 80% of the desire nominal battery charge being particularly suitable.

In step 110, the fuel cell system 10 adjusts the partial pressure of fuel flow to the fuel cell stack 14 to maintain the desired battery charge. For example, the actuator 30 may adjust the partial pressure of hydrogen flow via one or more valves 18. Alternatively, the actuator 30 may adjust the speed of one or more compressors (not shown). In step 112, the fuel cell system 10 adjusts the partial pressure of oxidant flow (e.g., the partial pressure of oxygen in air) to the fuel cell stack to maintain the desired battery charge. Again, the fuel cell system 10 may employ one or more values 18 and/or one or more compressors (not shown) to adjust the oxidant partial pressure. The controller 28 may attempt to maintain the appropriate stoichiometric relationship between the fuel and oxidant.

Voltage Controlled Embodiment of Fuel Cell System

Figure 6:
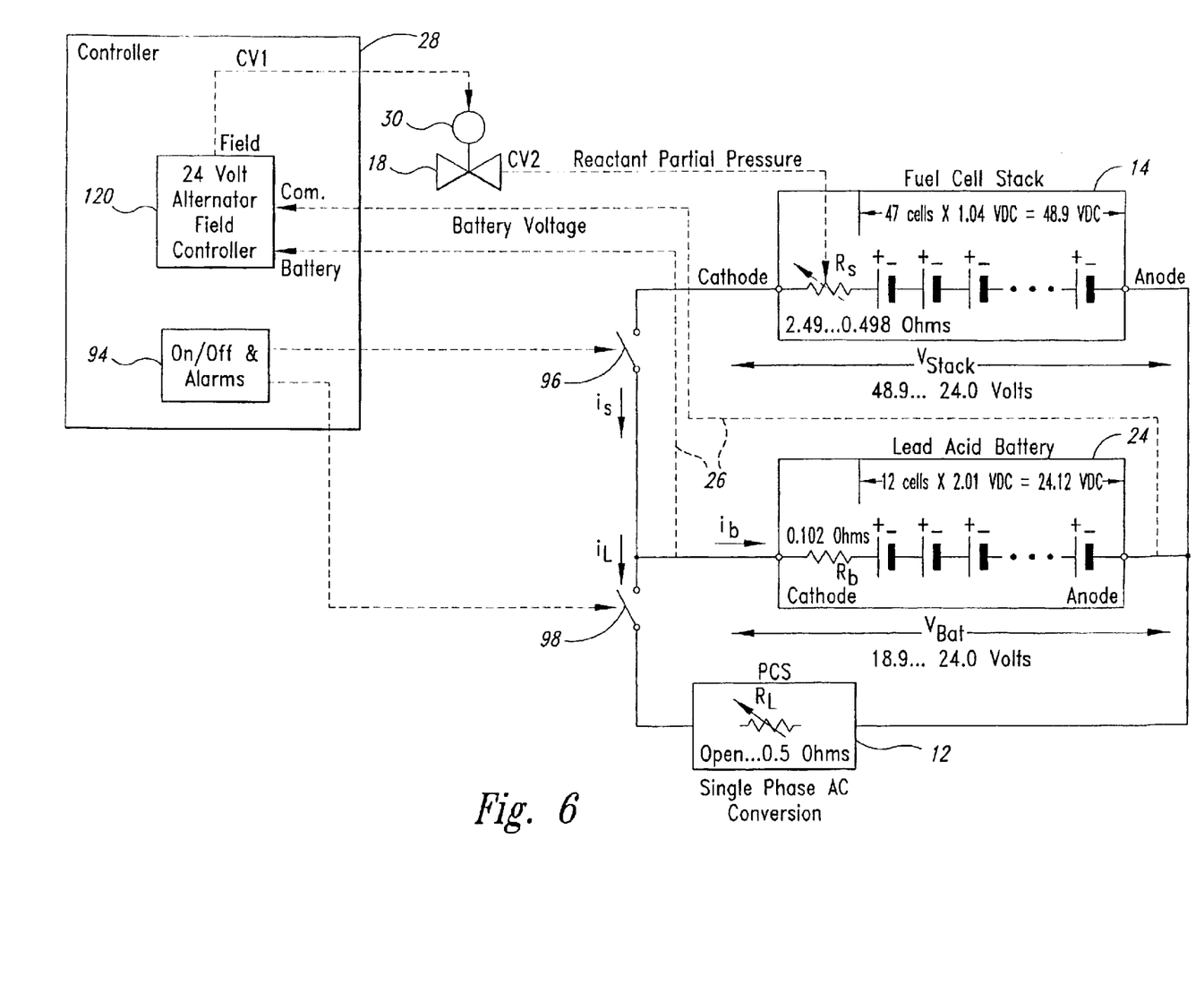
FIG. 6 is a schematic of a second specific embodiment of the fuel cell system of FIG. 1, that employs the voltage across the battery to maintain an approximately constant voltage output.

FIG. 6 shows a second specific embodiment of the fuel cell system 10, employing the voltage $V_B$ across the battery 24 as the operating condition. In the embodiment of FIG. 6, the sensor 26 takes the form of a voltage sensor for detecting voltage $V_B$ across the battery 24. The controller 28 takes a form similar to a field controller 120. Field controllers are commonly found in the alternators of automotive systems, as well as other electrical systems. The field controller 120 supplies an output CV1 to the actuator 30 to control the reactant partial pressure to the fuel cell stack 14.

Figure 7:
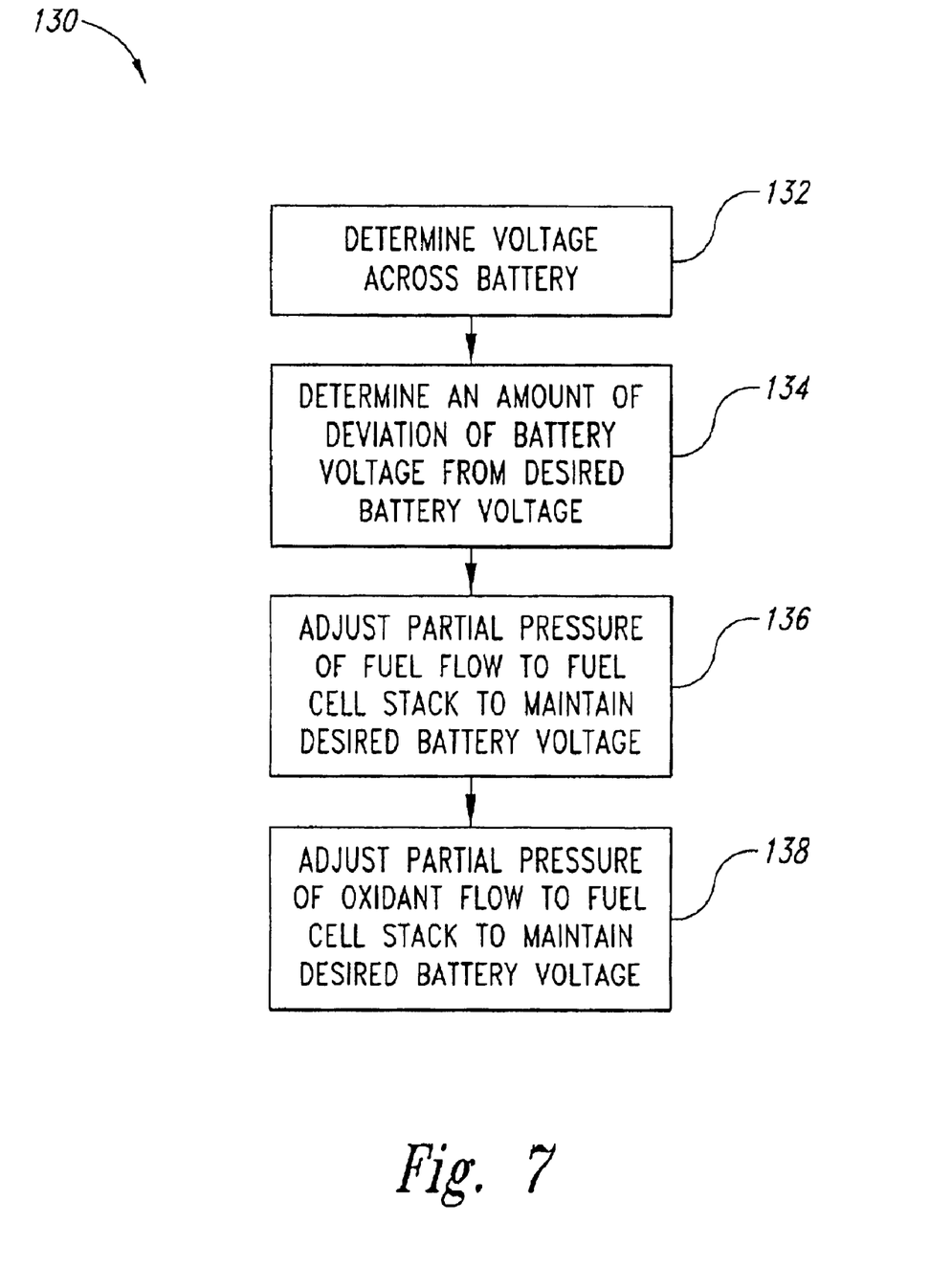
FIG. 7 is a flow diagram of one method of operating the fuel cell system of FIG. 6.

FIG. 7 shows a method 130 of operating the fuel cell system 10 of FIG. 6. In step 132, the voltage sensor 26 determines the voltage $V_B$ across the battery 24. In step 134, the field controller 120 determines an amount of deviation of battery voltage $V_B$ from the desired battery voltage. In step 136, the controller 28 adjusts the partial pressure of the fuel flow to the fuel cell stack 14 to maintain the desired battery voltage. In step 138, the controller 28 adjusts the partial pressure of oxidant to the fuel cell stack to maintain the desired battery voltage. As noted above, the fuel cell system 10 may employ one or more valves, compressors, pumps and/or other regulating means to adjust the partial pressure of the fuel and/or oxidant.

Voltage Controlled, Interconnected Embodiment of Fuel Cell System

Figure 8:
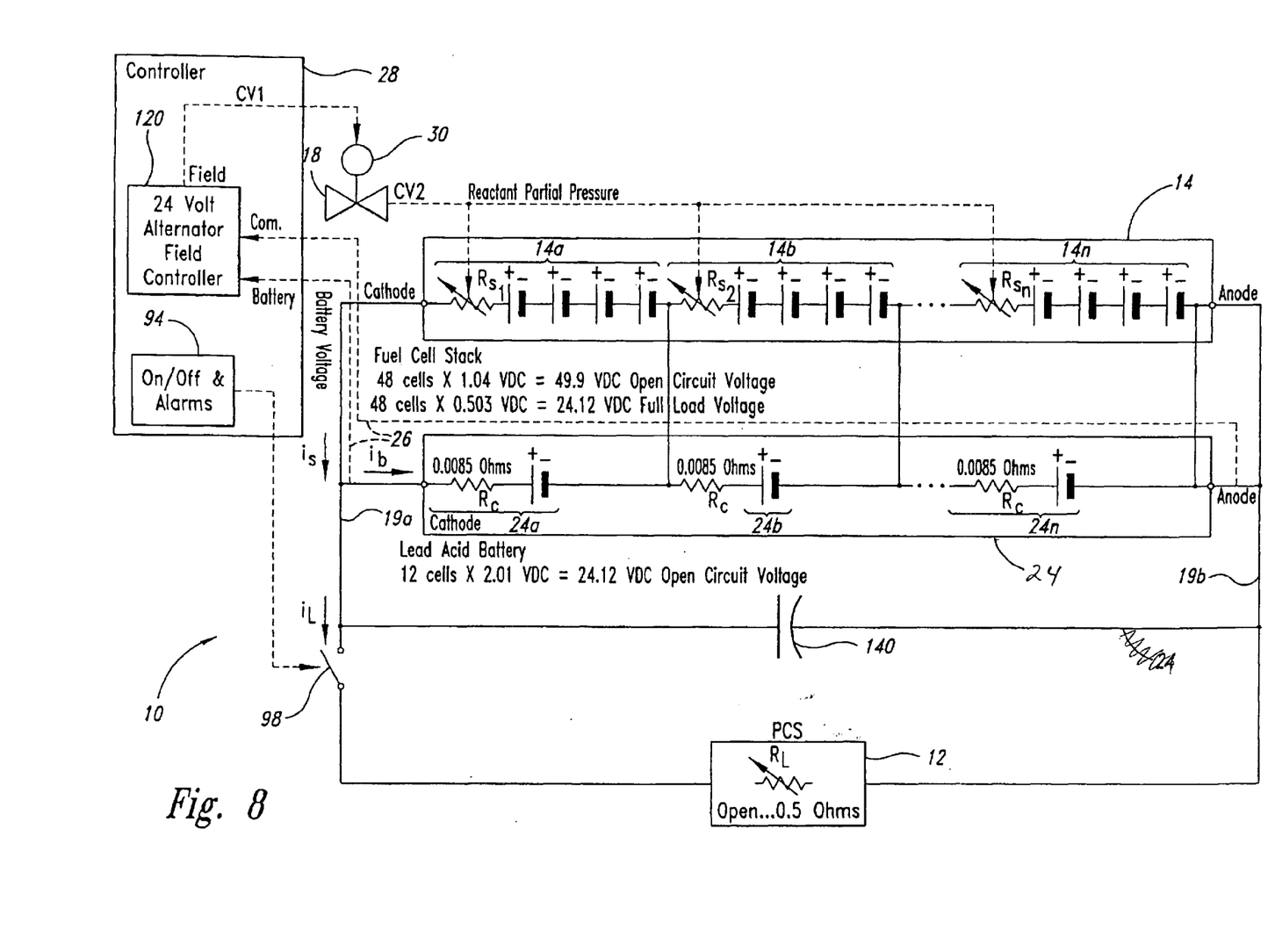
FIG. 8 is a schematic of a third specific embodiment of the fuel cell system of FIG. 1, that employs the voltage across the battery to maintain an approximately constant voltage output and in which portions of the fuel cell stack are interconnected with portions of the battery.

FIG. 8 shows a further embodiment of the fuel cell system 10 where the operating condition takes the form of the voltage $V_B$ across the battery 24 and where portions of the battery 24 are interconnected with portions of the fuel cell stack 14.

In particular, the fuel cell stack 14 can include groups or portions 14a, 14b, . . . 14n which are interconnected with respective groups or portions of the battery, 24a, 24b, . . . 24n. While illustrated as one battery cell 24a, 24b, . . . 24n to each set of fuel cells 14a, 14b . . . 14n, the fuel cell system 10 can employ other ratios of battery cells to fuel cells. Additionally, the fuel cell system 10 of FIG. 4 can also interconnect portions of fuel cell stack 14 and portions of the battery 24, in a similar manner to that described immediately above.

The fuel cell system 10 can include a capacitor, such as a supercapacitor 140, electrically coupled in parallel across the load 12. The fuel cell system 10 of FIG. 8 may be operated in accordance with the method 130 of FIG. 7.

While not illustrated in FIG. 8, separate control elements such as valve 18, controller 28, and/or actuator 30 can be associated with respective ones the sets of fuel cells 14a, 14b . . . 14n.

Currents, Voltages, and Resistance of Fuel Cell System and Load

FIGS. 9A–9F show a series of graphs illustrating the relationship between various currents, voltages, and resistance in the fuel cell system 10 in single phase AC operation where the fuel cell stack is sufficiently powering the load without draining or recharging the battery. The various graphs of FIG. 9A–9F share a common, horizontal time axis.

Figure 9A:
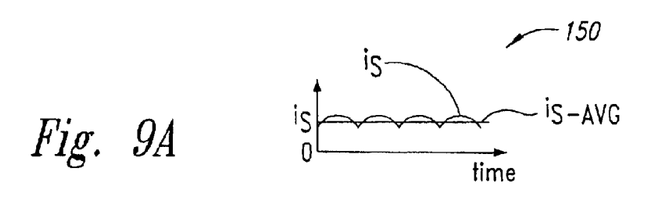
FIGS. 9A–9F are a series of graphs relating stack, battery and load currents, battery and bus voltages and load resistances of the fuel cell system, where the fuel cell stack is sufficiently powering the load without draining or recharging the battery.
Figure 9B:
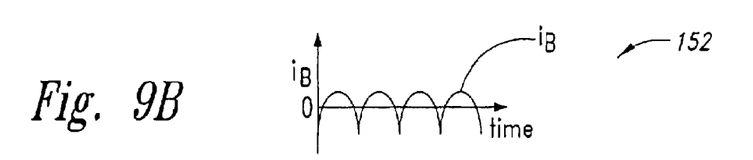
Figure 9C:
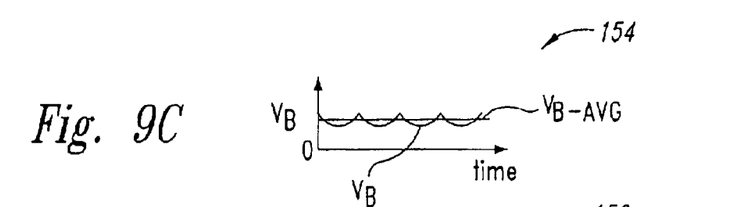
Figure 9D:
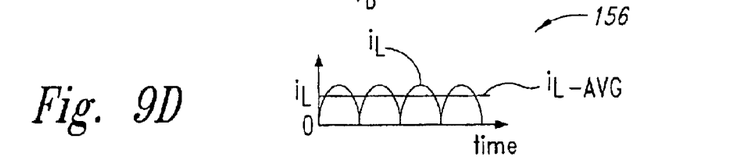
Figure 9E:
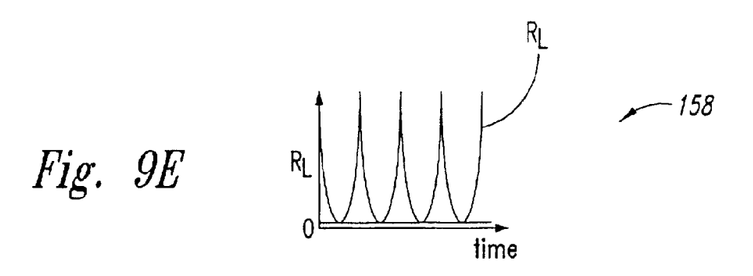
Figure 9F:
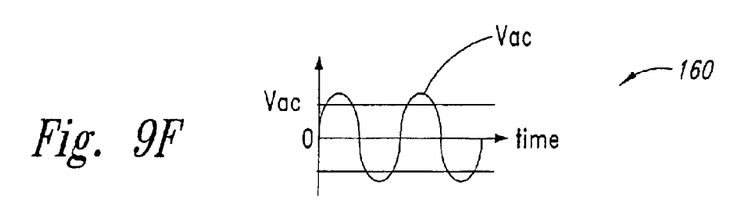

FIG. 9A is a graph 150 illustrating the actual stack current is and the average stack current $i_{S\text{-}AVG}$ as a function of time. FIG. 9B is a graph 152 illustrating the actual battery current $i_B$ as a function of time. FIG. 9C is a graph 154 illustrating the actual battery voltage $V_B$ and the average battery voltage $V_{B\text{-}AVG}$ as a function of time. FIG. 9D is a graph 156 illustrating the actual current through the load $i_L$ and the average load current $I_{L\text{-}AVG}$ as a function of time. FIG. 9E is a graph 158 illustrating the actual load resistance $R_L$ as a function of time. FIG. 9F is a graph 160 illustrating an AC voltage $V_{ac}$ across the load 12 as a function of time.

Figure 10A:
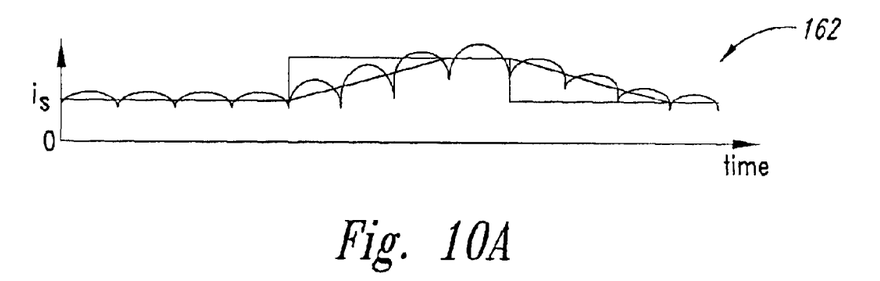
FIGS. 10A–C are a series of graphs relating stack, battery and load current over time for the fuel cell systems, where the battery supplies current to the load to cover a shortfall from the fuel cell stack and the fuel cell stack later recharges the battery.
Figure 10B:
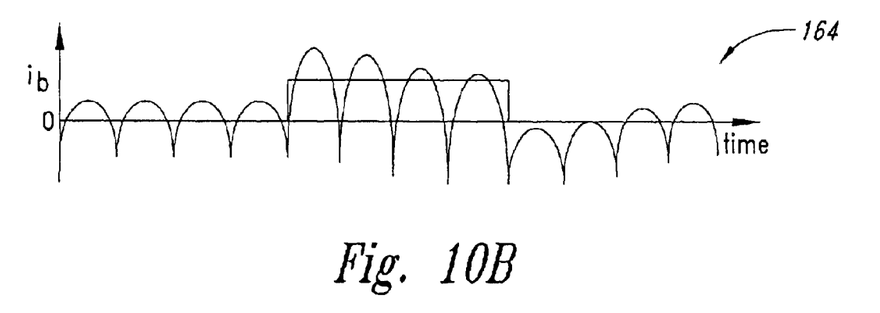
Figure 10C:
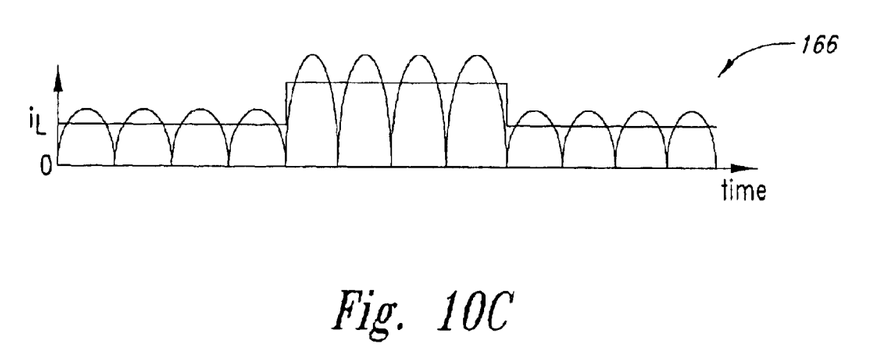

FIGS. 10A–10C show a series of graphs illustrating the relationship between various currents, voltages, and resistance in the fuel cell system 10 in single phase AC operation where the battery supplies current to the load to cover a shortfall from the fuel cell stack and the fuel cell stack later recharges the battery. The various graphs of FIGS. 10A–10C share a common, horizontal time axis.

FIG. 10A is a graph 162 illustrating the stack current is as a function of time. FIG. 10B is a graph 164 illustrates the battery current $i_B$ as a function of time. FIG. 10C is a graph 166 illustrating the load current $i_L$ as a function of time. As can be seen from FIGS. 10A–10C, as the load 12 increases demand, the battery 24 supplies current to make up for the shortfall from the fuel cell stack 14. As the load 12 decreases demand, the fuel cell stack 14 recharges the battery 24 until the battery 24 returns to the float voltage.

Fuel Cell Systems as Component Blocks of Combined Fuel Cell System

Figure 11:
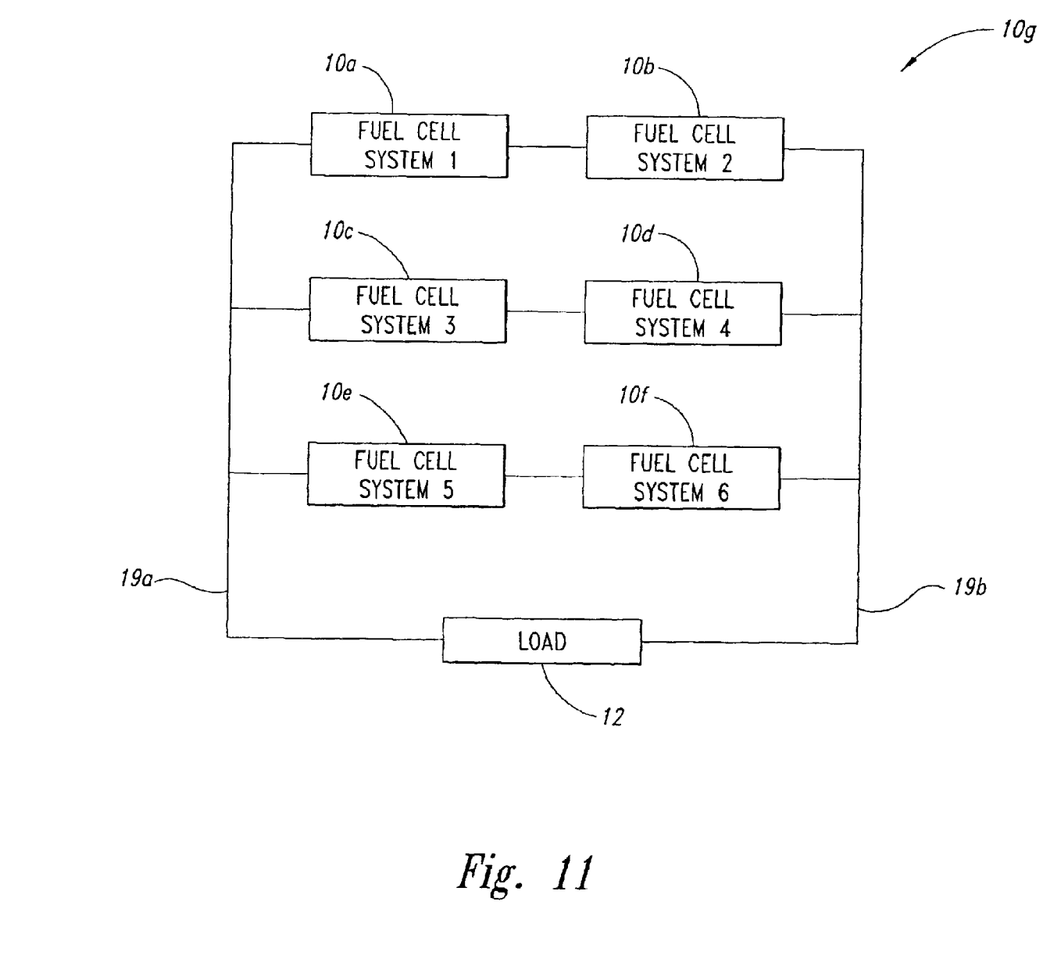
FIG. 11 is a schematic diagram of a number of the fuel cell systems of FIG. 1, electrically coupled to form a combination fuel cell system for powering a load at a desired voltage and current.

FIG. 11 shows a number of fuel cell systems 10a–10f, electrically coupled to form a combined fuel cell system 10g, for powering the load 12 at a desired voltage and current. The fuel cell systems 10a–10f can take the form of any of the fuel cell systems 10 discussed above, for example the fuel cell systems 10 illustrated in FIGS. 1, 4 and 8.

For example, each of the fuel cell systems 10a–10f may be capable of providing a current of 50 A at 24V. Electrically coupling a first pair of the fuel cell systems 10a, 10b in series provides 50 A at 48V. Similarly electrically coupling a second pair of the fuel cells systems 10c, 10d in series provides 50 A at 48V. Electrically coupling these two pairs of fuel cell systems 10a, 10b and 10c, 10d in parallel provides 100 A at 48V. Electrically coupling a third pair of fuel cells systems 10e, 10f in series provides an 50 A at 48V. Electrically coupling the third pair of fuel cell systems 10e, 10f in parallel with the first and second pairs of fuel cell systems 10a:10b, 10c:10d, 10e:10f provides 150 A at 48V.

FIG. 11 shows only one possible arrangement. One skilled in the art will recognize that other arrangements for achieving a desired voltage and current are possible. A combined fuel cell system 10g may include a lesser or greater number of individual fuel cell systems 10a–10f than illustrated in FIG. 11. Other combinations of electrically coupling numbers of individual fuel cell systems 10 can be used to provide power at other desired voltages and currents. For example, one or more additional fuel cell systems (not shown) can be electrically coupled in parallel with one or more of the fuel cell systems 10a–10b. Additionally, or alternatively, one or more additional fuel cell systems (not shown) can be electrically coupled in series with any of the illustrated pairs of fuel cell systems 10a:10b, 10c:10d, 10e:10f. Further, the fuel cell systems 10a–10f may have different voltage and/or current ratings. The individual fuel cell systems 10a–10f can be combined to produce an "n+1" array, providing a desired amount of redundancy and high reliability.

The above described approaches reduce the possibility of cell reversal since the stack voltage $V_S$ is clamped to the battery voltage $V_B$. If cell reversal is detected, a switch can automatically disconnect the fuel cell stack 14 from the battery 24. The battery 24 would continue to power the load 12 while the fault clears. The above described approaches may eliminate the need for voltage, current or power conversion or matching components between the fuel cell stack, battery and/or load. The above described approaches may also eliminate the need for blocking diodes, which generally reduce the efficiency of the system through heat dissipation.

Although specific embodiments of and examples for the fuel cell system and method are described herein for illustrative purposes, various equivalent modifications can be made without departing from the spirit and scope of the invention, as will be recognized by those skilled in the relevant art. For example, the teachings provided herein can be applied to fuel cell systems including other types of fuel cell stacks or fuel cell assemblies, not necessarily the polymer exchange membrane fuel cell assembly generally described above. The fuel cell system can employ various other approaches and elements for adjusting reactant partial pressures. The various embodiments described above can be combined to provide further embodiments. Commonly assigned U.S. patent application Ser. No. 10/017,462 entitled "METHOD AND APPAMTUS FOR MULTIPLE MODE CONTROL OF VOLTAGE FROM A FUEL CELL SYSTEM" filed Dec. 14, 2001; and U.S. patent application Ser. No. 10/017,461 entitled "FUEL CELL SYSTEM MULTIPLE STAGE VOLTAGE CONTROL METHOD AND APPARATUS" filed Dec. 14, 2001. now U.S. Pat. No. 6,573,682 issued Jun. 3, 2003, are incorporated herein by reference in their entirety. Aspects of the invention can be modified, if necessary, to employ systems, circuits and concepts of various patents, applications and publications to provide yet further embodiments of the invention.

These and other changes can be made to the invention in light of the above-detailed description. In general, in the following claims, the terms used should not be construed to limit the invention to the specific embodiments disclosed in the specification and claims, but should be construed to include all fuel cell systems that operate in accordance with the claims. Accordingly, the invention is not limited by the disclosure, but instead its scope is to be determined entirely by the following claims.

What is claimed is:

1. A fuel cell system for providing power to a load, comprising:
   a voltage bus;
   a first fuel cell stack having a number of fuel cells electrically couplable across the voltage bus;
   a first battery having a number of battery cells electrically couplable in parallel across the first fuel cell stack on the voltage bus;
   a first reactant delivery system for delivering reactant to the fuel cells of the first fuel cell stack, the first reactant delivery system including at least a first control element adjustable to control a partial pressure in a flow of a reactant to at least some of the fuel cells of the first fuel cell stack;
   a first control circuit coupled to receive signals corresponding to an operating condition of the first battery and configured to determine a deviation of the operating condition of the first battery from a desired operational condition of the first battery based on the received signals, the first control circuit further coupled to control the at least first control element based on the determined deviation;
   a second fuel cell stack having a number of fuel cells electrically couplable across the voltage bus;
   a second battery having a number of battery cells electrically couplable in parallel across the second fuel cell stack on the voltage bus;
   a second reactant delivery system for delivering reactant to the fuel cells of the second fuel cell stack, the second reactant delivery system including at least a second control element adjustable to control a partial pressure in a flow of a reactant to at least some of the fuel cells of the second fuel cell stack;
   a second control circuit coupled to receive signals corresponding to an operating condition of the second battery and configured to determine a deviation of the operating condition of the second battery from a desired operational condition of the second battery based on the received signals, the second control circuit further coupled to control the at least second control element based on the determined deviation.

2. The fuel cell system of claim 1 wherein the second fuel cell stack and the second battery are electrical coupled in series with the first fuel cell stack and the first battery.

3. The fuel cell system of claim 1 wherein the second fuel cell stack and the second battery are electrical coupled in parallel with the first fuel cell stack and the first battery.

4. The fuel cell system of claim 1, further comprising:
   a third fuel cell stack having a number of fuel cells electrically couplable across the voltage bus;
   a third battery having a number of battery cells electrically couplable in parallel across the third fuel cell stack on the voltage bus;

a third reactant delivery system for delivering reactant to the fuel cells of the third fuel cell stack, the third reactant delivery system including at least a third control element adjustable to control a partial pressure in a flow of a reactant to at least some of the fuel cells of the third fuel cell stack;

a third control circuit coupled to receive signals corresponding to an operating condition of the third battery and configured to determine a deviation of the operating condition of the third battery from a desired operational condition of the third battery based on the received signals, the third control circuit further coupled to control the at least third control element based on the determined deviation.

5. The fuel cell system of claim 1, further comprising:

a third fuel cell stack having a number of fuel cells electrically couplable across the voltage bus;

a third battery having a number of battery cells electrically couplable in parallel across the third fuel cell stack on the voltage bus;

a third reactant delivery system for delivering reactant to the fuel cells of the third fuel cell stack, the third reactant delivery system including at least a third control element adjustable to control a partial pressure in a flow of a reactant to at least some of the fuel cells of the third fuel cell stack;

a third control circuit coupled to receive signals corresponding to an operating condition of the third battery and configured to determine a deviation of the operating condition of the third battery from a desired operational condition of the third battery based on the received signals, the third control circuit further coupled to control the at least third control element based on the determined deviation, wherein the second fuel cell stack and the second battery are electrical coupled in series with the first fuel cell stack and the first battery, and with the third fuel cell stack and the third battery.

6. The fuel cell system of claim 1, further comprising:

a third fuel cell stack having a number of fuel cells electrically couplable across the voltage bus;

a third battery having a number of battery cells electrically couplable in parallel across the third fuel cell stack on the voltage bus;

a third reactant delivery system for delivering reactant to the fuel cells of the third fuel cell stack, the third reactant delivery system including at least a third control element adjustable to control a partial pressure in a flow of a reactant to at least some of the fuel cells of the third fuel cell stack;

a third control circuit coupled to receive signals corresponding to an operating condition of the third battery and configured to determine a deviation of the operating condition of the third battery from a desired operational condition of the third battery based on the received signals, the third control circuit further coupled to control the at least third control element based on the determined deviation, wherein the second fuel cell stack and the second battery are electrical coupled in series with the first fuel cell stack and the first battery, and wherein the third fuel cell stack and the third battery are electrically coupled in parallel with the first and the second fuel cell stack and the first and the second battery.

* * * * *